(12) United States Patent
Mo et al.

(10) Patent No.: US 10,783,462 B1
(45) Date of Patent: Sep. 22, 2020

(54) WAREHOUSE BATCH PRODUCT PICKING OPTIMIZATION USING HIGH DENSITY AREAS TO MINIMIZE TRAVEL DISTANCE

(71) Applicant: COUPANG CORP., Seoul (KR)

(72) Inventors: Wenting Mo, Beijing (CN); Kai Wei, Shanghai (CN); Jinxing Lu, Shanghai (CN); Zijian Hu, Beijing (CN); Dong Yang, Shanghai (CN)

(73) Assignee: COUPANG CORP., Seoul (KR)

( * ) Notice: Subject to any disclaimer, the term of this patent is extended or adjusted under 35 U.S.C. 154(b) by 0 days.

(21) Appl. No.: 16/386,948

(22) Filed: Apr. 17, 2019

(51) Int. Cl.
| | |
|---|---|
| *G06Q 10/08* | (2012.01) |
| *G06Q 50/28* | (2012.01) |
| *G06Q 10/04* | (2012.01) |
| *G06N 20/00* | (2019.01) |
| *G06Q 10/06* | (2012.01) |
| *G06F 16/903* | (2019.01) |

(52) U.S. Cl.
CPC ..... *G06Q 10/047* (2013.01); *G06F 16/90335* (2019.01); *G06N 20/00* (2019.01); *G06Q 10/06316* (2013.01); *G06Q 10/0875* (2013.01)

(58) Field of Classification Search
CPC ...... G06Q 10/087; G06Q 10/08; G06Q 10/06; G06Q 10/08355; G06Q 10/0631
See application file for complete search history.

(56) References Cited

U.S. PATENT DOCUMENTS

| | | | | | |
|---|---|---|---|---|---|
| 3,908,800 | A | * | 9/1975 | Drapeau | B65G 1/1375 186/56 |
| 5,310,997 | A | * | 5/1994 | Roach | A47F 9/046 235/375 |
| 5,509,538 | A | * | 4/1996 | Spindler | B65G 1/1376 198/370.01 |
| 5,666,493 | A | * | 9/1997 | Wojcik | G06Q 10/087 705/22 |
| 6,876,958 | B1 | * | 4/2005 | Chowdhury | G06Q 10/04 414/801 |

(Continued)

FOREIGN PATENT DOCUMENTS

| | | |
|---|---|---|
| KR | 20180073220 A | 7/2018 |
| KR | 20180124299 A | 11/2018 |

OTHER PUBLICATIONS

Saner, Alhmet Can, Design of a warehouse order picking policy using genetic algorithm Instanbul Bilgi University, 2017 (Year: 2017).*

(Continued)

*Primary Examiner* — Scott L Jarrett
(74) *Attorney, Agent, or Firm* — Finnegan, Henderson, Farabow, Garrett & Dunner, LLP

(57) ABSTRACT

The disclosed embodiments provide computer-implemented systems and methods for batch picking optimization. They system may include one or more memory devices storing instructions and one or more processors configured to execute the instructions to receive an order comprising one or more items for picking. Additionally, the system may calculate one or more high density areas in a fulfillment center by calculating distances between a first item in the one or more items and at least one other item in the one or more items using a search algorithm. Additionally, the system may calculate nearest neighboring items for the one or more items and generate a high density area by choosing a plurality of the nearest neighboring items.

17 Claims, 11 Drawing Sheets

500

Layout drawing

Coordinate
Calculation a(x1,y1)
b(x2,y2)

Location pair (a,b)

A* Shortest
Path Algorithm distance(a,b)

Store all shortest distance pairs 508

Batch Visualization Tool
510

Density algorithm 509

(56) References Cited

U.S. PATENT DOCUMENTS

| | | | | |
|---|---|---|---|---|
| 7,031,801 | B1* | 4/2006 | Hodge | B65G 1/137 700/213 |
| 7,246,706 | B1* | 7/2007 | Shakes | B07C 7/02 209/614 |
| 7,774,243 | B1* | 8/2010 | Antony | G06Q 10/0875 414/243 |
| 8,055,377 | B2* | 11/2011 | Yair | G06Q 10/087 414/273 |
| 8,326,452 | B2* | 12/2012 | Somin | G06Q 50/24 700/216 |
| 8,571,915 | B1* | 10/2013 | Wong | G06Q 10/06 705/7.26 |
| 9,656,804 | B2* | 5/2017 | Lyon | G06Q 10/0875 |
| 9,733,633 | B2* | 8/2017 | Wickham | G05B 15/02 |
| 9,834,379 | B2* | 12/2017 | Varley | B65G 1/137 |
| 2006/0255951 | A1* | 11/2006 | Roeder | B62B 3/06 340/572.7 |
| 2008/0215179 | A1* | 9/2008 | Yair | G06Q 10/08 700/215 |
| 2009/0082902 | A1* | 3/2009 | Foltz | G06Q 10/087 700/214 |
| 2009/0136333 | A1* | 5/2009 | Schafer | B65G 1/1378 414/807 |
| 2010/0218131 | A1* | 8/2010 | Holm-Petersen | G06Q 10/087 715/771 |
| 2011/0035247 | A1* | 2/2011 | Perry | G06Q 10/06 705/7.38 |
| 2012/0150340 | A1* | 6/2012 | Suess | B65G 1/137 700/216 |
| 2012/0232689 | A1* | 9/2012 | Buchmann | B65G 1/137 700/216 |
| 2012/0330458 | A1* | 12/2012 | Weiss | B66F 9/063 700/216 |
| 2013/0211977 | A1* | 8/2013 | Lyon | G06Q 10/0875 705/29 |
| 2013/0317642 | A1* | 11/2013 | Asaria | G06Q 10/08 700/216 |
| 2014/0040075 | A1* | 2/2014 | Perry | G06Q 30/0635 705/26.81 |
| 2014/0107833 | A1* | 4/2014 | Segawa | G06Q 10/087 700/214 |
| 2014/0336814 | A1* | 11/2014 | Moore | G06Q 10/087 700/216 |
| 2014/0351101 | A1* | 11/2014 | Danelski | G06Q 10/087 705/28 |
| 2015/0073586 | A1* | 3/2015 | Weiss | B66F 9/063 700/216 |
| 2015/0081088 | A1* | 3/2015 | Lyon | G06Q 10/0875 700/216 |
| 2016/0176635 | A1* | 6/2016 | Varley | B65G 1/137 700/216 |
| 2016/0176637 | A1* | 6/2016 | Ackerman | B65G 1/1375 700/215 |
| 2017/0220984 | A1* | 8/2017 | Agarwal | G06Q 10/0833 |
| 2017/0369245 | A1* | 12/2017 | Suemitsu | B65G 1/137 |
| 2018/0075521 | A1* | 3/2018 | Nair | G06Q 30/0639 |
| 2018/0211347 | A1* | 7/2018 | Chen | G05D 1/0297 |
| 2018/0218311 | A1 | 8/2018 | Kumar et al. | |
| 2018/0244473 | A1* | 8/2018 | Mathi | B65G 1/1378 |
| 2018/0330316 | A1 | 11/2018 | Rajkhowa et al. | |
| 2019/0049975 | A1 | 2/2019 | Kattepur et al. | |
| 2019/0138978 | A1* | 5/2019 | Johnson | G06Q 10/08 |

OTHER PUBLICATIONS

De Koster, Rene B.M. et al., Determining the number of zones in a pick-and-sort order picking system International Journal of Production Research, 2011 (Year: 2011).*

Gue, Kevin R. et al., The effects of pick density on order picking areas with narrow aisles IIE Transactions, vol. 38, 2006 (Year: 2006).*

De Koster, Rene et al., Design and control of warehouse order picking: a literature review European Journal of Operational Research, vol. 182, No. 2, 2007 (Year: 2007).*

Key, Ryan et al., Warehouse pick path optimization algorithm analysis International Conference Foundations of Computer Science, FCS'15, 2015 (Year: 2015).*

Urahama K. et al., Gradient Descent Learning of Nearest Neighbor Classifiers with Outlier Rejection Pattern Recognition, vol. 28, No. 5, 1995 (Year: 1995).*

Kulak, Osman et al., Joint order batching and picking routing in a single and multiple cross aisles warehouses using cluster based tabu search algorithms, Flexible Service Manufacturing Journal, vol. 24, 2012 (Year: 2012).*

De Villiers, Anton Pierre, Minimising the total travel distance to pick orders on a unidirectional picking line Stellenbosch University, Dec. 2011 (Year: 2011).*

Daniels, Richard L. et al., A model for warehouse order picking European Journal of Operational Research, vol. 105, 1998 (Year: 1998).*

Valle, Cristiano Arbex et al., Optimally solving the joint order batching and picker routing problem European Journal of Operational Research, vol. 262, No. 3, Nov. 2017 (Year: 2017).*

Order Picking: Pick Sequencing and Batching MHI, Jul. 2014 (Year: 2014).*

Zaidi, Nayyar Abbas et al., A Gradient-Based Metric Learning Algorithm for k-NN Classifiers AI 2010 Advances in Artifiical Intelligence, 2010 (Year: 2010).*

Albareda-Sambola, Maria et al., Variable Neighborhood Search for Order Batching in a Warehouse APJOR, vol. 26, 2009 (Year: 2009).*

Oracle Warehouse Management—User's Guide Release 11i Oracle, Mar. 2005 (Year: 2005).*

Horvat, Matic, An Approach to Oder Picking Optimization in Warehouses University of Ljubljana, 2012 (Year: 2012).*

Molnar, Balazs et al., Multi-Objective Routing and Scheduling of Order Pickers in a Warehouse International Journal of Simulation, vol. 6, No. 5, 2002 (Year: 2002).*

Won, Jaeueon, Order batching and picking optimization in terms of supply chain management Iowa State University, 2004 (Year: 2004).*

International Search Report and Written Opinion of the International Search Authority for International Application No. PCT/162020/053050 dated Jul. 9, 2020 (10 pages).

* cited by examiner

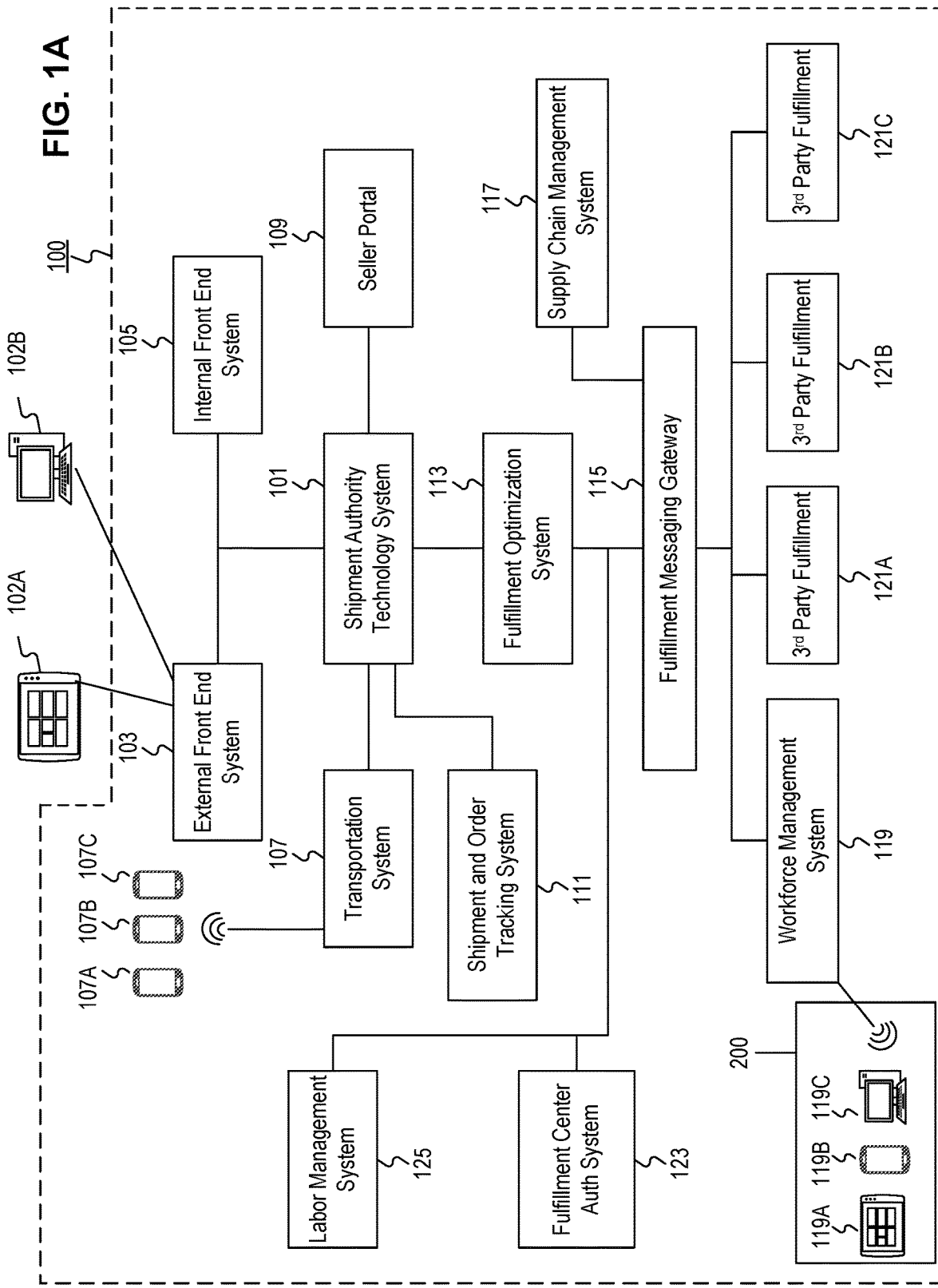

11/28/2018                                Shopping Cart

| General Purchasing (1) | Periodic Delivery (0) |

☑ Select All          Product Information          Item Amount   shipping fee

Rocket shipping products   free shipping

☑   Mozzarella cheese, 1kg, 2 pieces
      Tomorrow (Thursday) 11/29
      Arrival guarantee (order before 12 pm)      [1▼]   free
                   20,510 won

| Even if you add other rocket shipping products, free shipping available | shipping Free   Order amount
                                                                                                                                        $20.00

☑ Select All (1/1)   [Delete all]   [sold out / discontinued products clear all]   [interest payment]

|                                                                                                                               $___.00 |

[Continue shopping]    [Buy now]

Customers who bought this product also purchased

1/5

Rosé spaghetti sauce,     Napoli Chunky Tomato     Grated Parmesan     Bacon and Mushroom Cream
600g, 2 pieces              Pasta Sauce,                 cheese,                    Pasta Sauce,
6,500 won                 3,800 won                  6,460 won               4,870 won
(54 won per 10g)         (86 won per 10g)          (285 won per 10g)       (108 won per 10g)

FIG. 1D

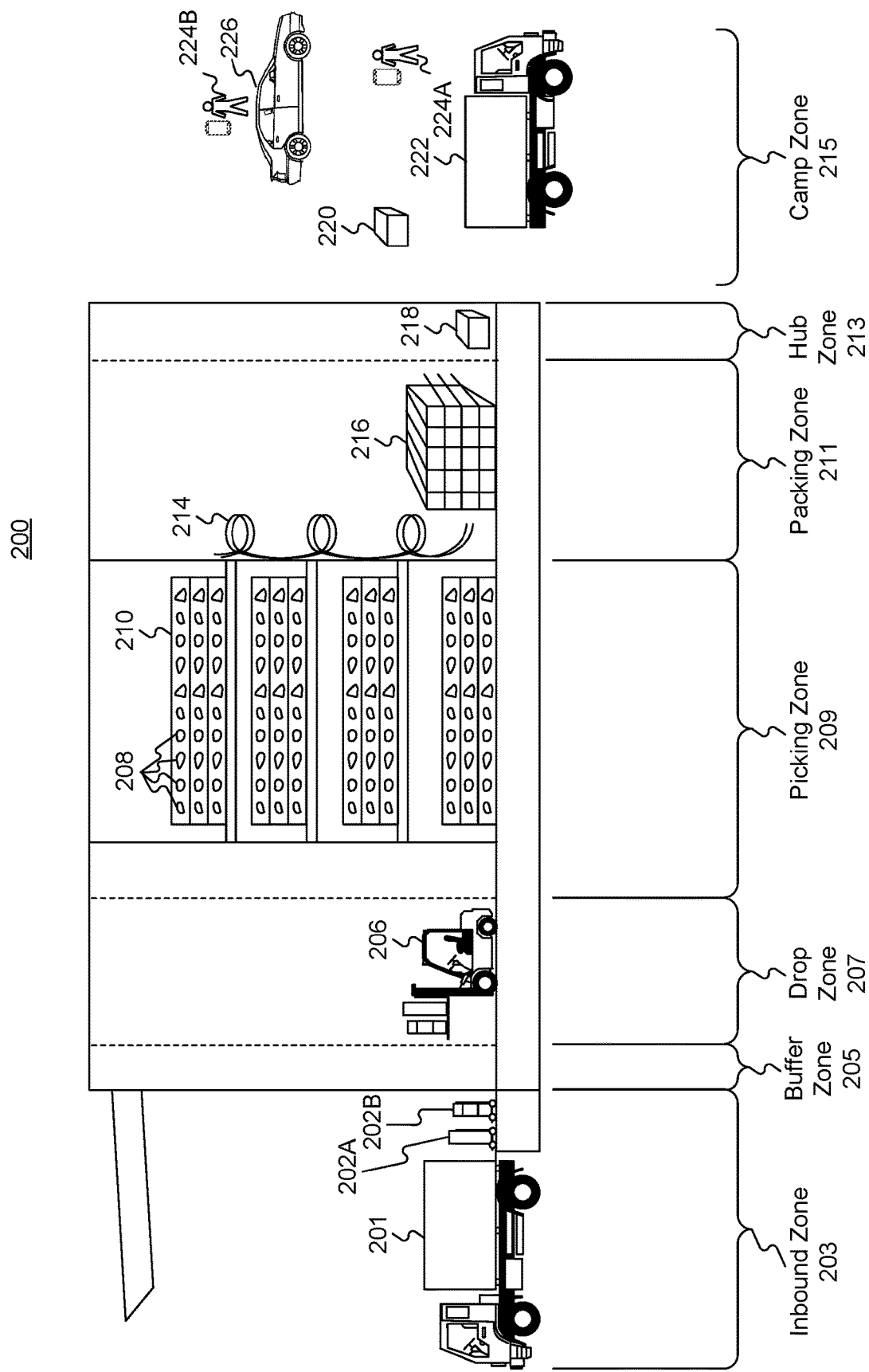

600
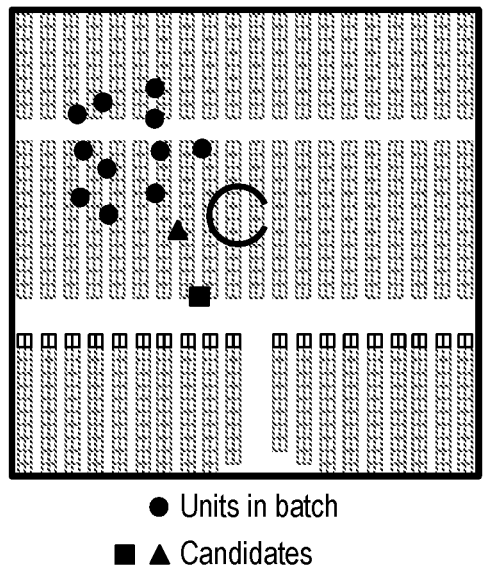
● Units in batch
■ ▲ Candidates
650
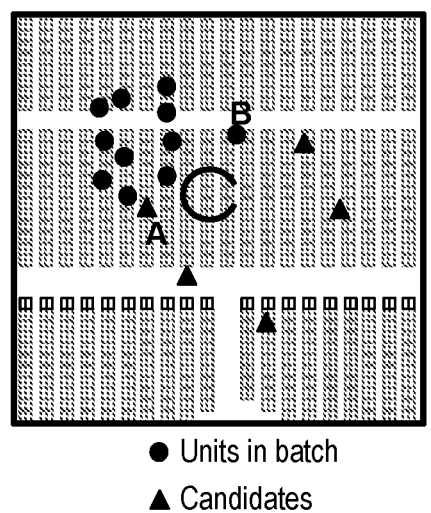
● Units in batch
▲ Candidates
FIG. 6

WAREHOUSE BATCH PRODUCT PICKING OPTIMIZATION USING HIGH DENSITY AREAS TO MINIMIZE TRAVEL DISTANCE

TECHNICAL FIELD

The present disclosure generally relates to computerized systems and methods for artificial intelligence batch picking optimization and communication. In particular, embodiments of the present disclosure relate to inventive and unconventional systems which may calculate one or more high density areas in a fulfillment center, create one or more batches, add items from the one or more high density areas using a gradient descent algorithm into a single batch, and provide a list of items for adding/gathering.

BACKGROUND

Present systems for batch optimization and communication define paths along aisles and shelves in a fulfillment center and assign items for picking along the defined paths to a picker. Pickers select a batch of items that includes parts or all of one or more orders placed by customers. Pickers may be assigned the batch and may be sent a path (via a user device) that instructs the picker on how to walk up and down the aisles of a fulfillment center to gather all of the items in that batch. This system is inefficient because it causes delays in assigning orders to pickers.

Consequently, pickers must walk a significant amount of time and distance to pick up items and may delay fulfillment of any order in the batch. Such delay in batch picking causes additional interruptions in the shipment process in many respects. For example, delaying an order shipment until an entire batch with distant items is picked causes delays in the processing of multiple orders.

In view of the shortcomings of current electronic systems and methods for batch optimization and communication, a system for enhancing the shipping, transportation, and logistics operation of shipping orders using batch optimization—calculating high density areas in the fulfillment center and creating batches based on those areas—is desired. More specifically, a computer-implemented system and method for artificial intelligence batch picking optimization and communication is desired to provide efficiency by finishing orders faster since items in an optimized batch are closer to each other and may be picked more quickly. Such a system would allow for efficiently grouping items by a density algorithm, getting more orders through the system faster, taking in more orders, and cutting down wasted time walking to distant items. Therefore, there is a need for improved electronic methods and systems for artificial intelligence batch picking optimization and communication.

SUMMARY

One aspect of the present disclosure is directed to a computer-implemented system for batch picking optimization. For example, certain embodiments may include one or more memory devices storing instructions and one or more processors configured to execute the instructions. In some embodiments, the one or more processors are configured to execute the instructions to receive an order comprising one or more items for picking and calculate one or more high density areas in a fulfillment center by: calculating distances between a first item in the one or more items and at least one other item in the one or more items using a search algorithm, calculating nearest neighboring items for the one or more items, and generating a high density area of the one or more high density areas by choosing a plurality of the nearest neighboring items. In some embodiments, the one or more processors are configured to execute the instructions to store, for the one or more items, a distance between the first item and a closest second item and create a batch based on the calculated one or more high density areas. Additionally, the one or more processors are configured to add items from the one or more high density areas into the batch using a gradient descent algorithm, the adding based on an item increasing an average distance least among pickable items and provide a list of items for gathering in the batch and a location on a user device for display.

Another aspect of the present disclosure is directed to a computer-implemented system for batch picking optimization. For example, certain embodiments may include one or more memory devices storing instructions and one or more processors configured to execute the instructions. In some embodiments, the one or more processors are configured to execute the instructions to receive an order comprising one or more items for picking and a digital map segmented into multiple zones and calculate one or more high density areas in a fulfillment center by: calculating distances between a first item in the one or more items and at least one other item in the one or more items using a search algorithm in a single zone of the multiple zones, calculating nearest neighboring items for the one or more items, and generating a high density area of the one or more high density areas by choosing a plurality of the nearest neighboring items. In some embodiments, the one or more processors are configured to store, for the one or more items, a distance between the first item and a closest second item and create a batch based on the calculated one or more high density areas from items in the single zone of the multiple zones. Additionally, the one or more processors are configured to add items from the one or more high density areas into the batch using a gradient descent algorithm, the adding based on an item increasing an average distance least among pickable items and provide a list of items for gathering in the batch and a location on a user device for display.

Yet another aspect of the present disclosure is directed to a computer-implemented method for batch picking optimization. For example, certain embodiments of the method may include receiving an order comprising one or more items for picking and a digital map segmented into multiple zones, wherein the digital map comprises location pairs, each pair representing two pickable items and calculating one or more high density areas in a fulfillment center by: calculating distances between a first item in the one or more items and at least one other item in the one or more items using a search algorithm in a single zone of the multiple zones, calculating nearest neighboring items for the one or more items, and generating a high density area of the one or more high density areas by choosing a plurality of the nearest neighboring items. In some embodiments, the method may further include storing, for the one or more items, a distance between the first item and a closest second item and creating a batch based on the calculated one or more high density areas from items in the single zone of the multiple zones. Additionally, the method may include adding items from the one or more high density areas into the batch using a gradient descent algorithm, the adding based on an item increasing an average distance least among pickable items and providing a list of items for gathering in the batch and a location on a user device for display.

Other systems, methods, and computer-readable media are also discussed herein.

BRIEF DESCRIPTION OF THE DRAWINGS

FIG. 1A is a schematic block diagram illustrating an exemplary embodiment of a network comprising computerized systems for communications enabling shipping, transportation, and logistics operations, consistent with the disclosed embodiments.

FIG. 1D depicts a sample Cart page that includes items in a virtual shopping cart along with interactive user interface elements, consistent with the disclosed embodiments.

FIG. 2 is a diagrammatic illustration of an exemplary fulfillment center configured to utilize disclosed computerized systems, consistent with the disclosed embodiments.

FIG. 6 depicts results of a gradient descent algorithm for walking distance optimization consistent with the disclosed embodiments.

DETAILED DESCRIPTION

Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for batch picking optimization. For example, certain embodiments may include one or more memory devices storing instructions and one or more processors configured to execute the instructions. In some embodiments, the one or more processors are configured to receive an order comprising one or more items for picking and calculate one or more high density areas in a fulfillment center by: calculating distances between a first item in the one or more items and at least one other item in the one or more items using a search algorithm, calculating nearest neighboring items for the one or more items, and generating a high density area by choosing a plurality of the nearest neighboring items. Additionally, the one or more processors are configured to store, for the one or more items, a distance between the first item and a closest second item and create a batch based on the calculated one or more high density areas. Moreover, the one or more processors are configured to add items from the one or more high density areas into the batch using a gradient descent algorithm, the adding based on an item increasing an average distance least among pickable items and provide a list of items for gathering in the batch and a location on a user device for display.

Furthermore, the present disclosure is directed to systems and methods for enhancing the shipping, transportation, and logistics operation of shipping orders using batch optimization—calculating high density areas in the fulfillment center and creating batches based on those areas. More specifically, the disclosed computer-implemented system and method for artificial intelligence batch picking optimization and communication provides efficiency by finishing orders faster since items in an optimized batch are closer to each other and may be picked more quickly. The present system allows for efficiently grouping items by a density algorithm, getting more orders through the system faster, taking in more orders, and cutting down wasted time walking to distant items.

Referring to FIG. 1A, a schematic block diagram illustrating an exemplary embodiment of a system 100 comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, may help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product may arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where network 101 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count of products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, may use it during the day, and may return it at the end of the day).

WMS 119, in some embodiments, may maintain a work log for each user associated with system 100. For example, WMS 119 may store information associated with each employee, including any assigned processes (e.g., unloading trucks, picking items from a pick zone, sorting apparatus work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

3rd party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker may receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") may receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages may go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
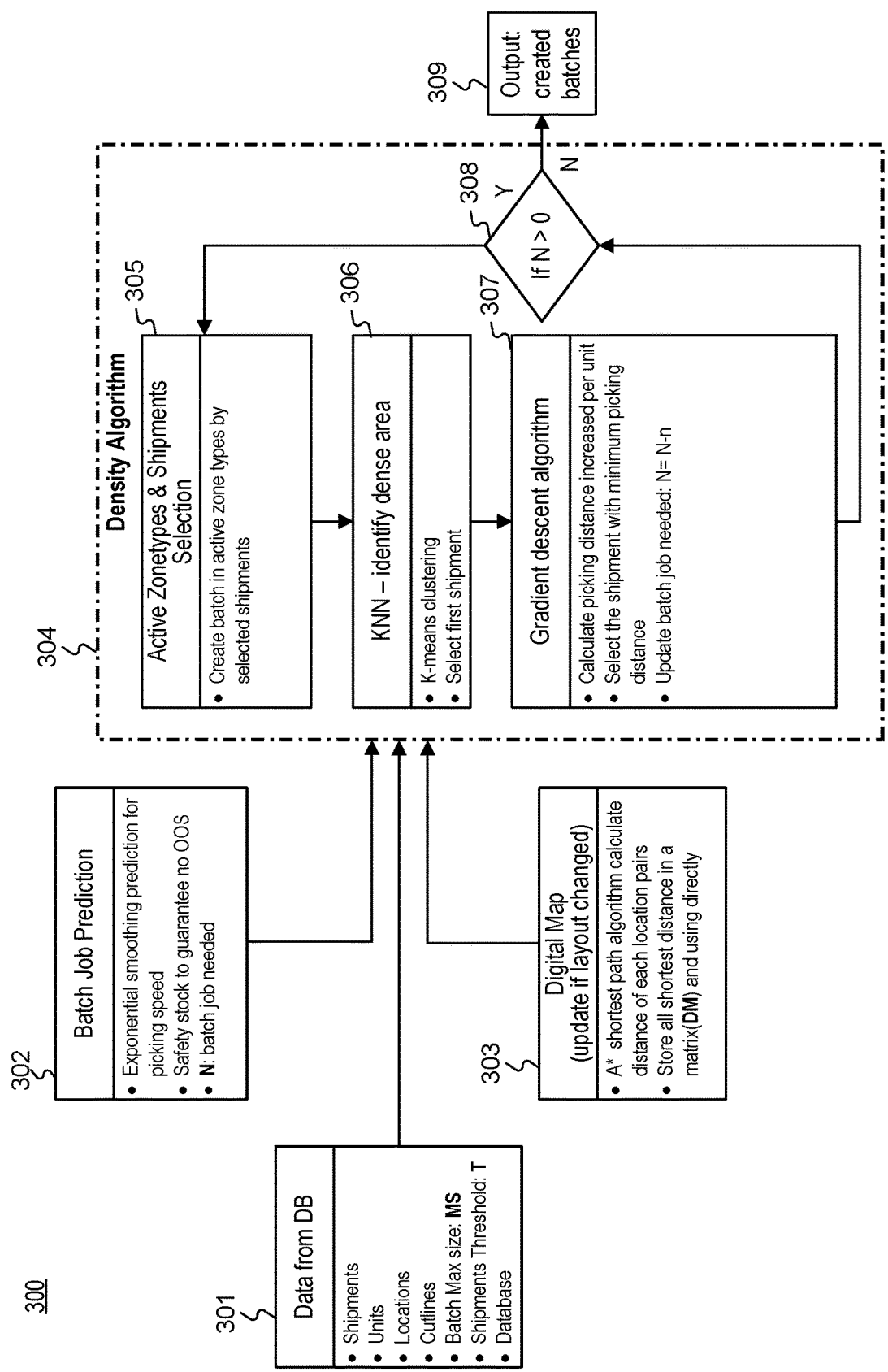
FIG. 3 is a block diagram of an exemplary process including batch creation, consistent with the disclosed embodiments.

FIG. 3 is a block diagram of an exemplary process 300 including batch creation, consistent with the disclosed embodiments. In some embodiments, "picking" entails selecting items from individual orders of a batch and placing them into totes. Picking processes may be performed by a machine (e.g., a robot or other device with appropriate apparatuses, including scanning devices and machinery to move totes or items), a human worker, or some combination (e.g., using machine-assisted labor).

In one embodiment, a batch includes items from multiple orders. Each of the orders of the batch may include items in the order represented by Stock Keeping Units (SKUs). In some embodiments, items of each order may have been placed by users at devices mobile device 102A or computer 102B of FIG. 1A through a website hosted on external front end system 103 of FIG. 1A. In some embodiments, automated scanning equipment (e.g., associated with computer 119C) may scan a barcode associated with the SKUs for storing information regarding the order parts for the picking process. In yet other embodiments, the SKUs allow a worker (as described above in FIG. 2) to read the order parts for the picking process.

In some embodiments, aspects of process 300 take place in picking zone 209 of FIG. 2, where a picker—workers or machines—picks items from individual orders of a batch and places them into totes. SAT system 101, WMS 119, or other devices depicted in FIG. 1A may perform one or more operations in process 300, as appropriate. For example, as discussed below, SAT system 101 may generate instructions to pick items based on the picker's location or other conditions, and send those instructions to a mobile device operated by a picker.

In prior art methods, pickers were required to walk a significant distance and take a significant amount of time to pick up items, which delayed fulfillment of orders in the batch and delayed assignment of items to pickers, which decreased throughput of the system. Some prior methods would assign items along a path to a single picker (static path). Such delay and unorganized method in batch picking causes additional interruptions in the shipment process in many respects. For example, delaying an order shipment until an entire batch with distant items is picked causes delays in the processing of multiple orders. As described below, by calculating high density areas in the fulfillment center and creating batches based on those areas, the present system creates efficiency in the batch process of shipping. More specifically, the computer-implemented system and method for artificial intelligence batch picking optimization and communication provides efficiency by finishing orders faster since items in an optimized batch are closer to each other and may be picked more quickly. The present system allows for efficiency through grouping items by a density algorithm, getting more orders through the system faster, taking in more orders, and cutting down wasted time walking to distant items.

Process 300 of FIG. 3 depicts data from DB (database) 301, batch job prediction 302, and digital map 303, each of which are used as input to density algorithm 304.

Data from DB 301 includes data related to shipments (e.g., orders made by users), units (e.g., storage units), locations (e.g., item positions), cutlines, a value MS representing batch maximum size (e.g., a numeric value indicating the maximum number of items to be gathered into a batch), a value T representing shipments thresholds (e.g., a number of shipments for each zone of FC 200), and other data.

Batch job prediction data 302 includes an exponential smoothing five-minute prediction to increase picking speed. For example, this prediction may be related to a time series prediction method for univariate data that may be extended to support data with a systematic trend or seasonal component. Batch job prediction data 302 uses an exponential smoothing method to predict the batch job consumed speed next period. Data 302 may also include data relating to safety stock, that is, the number of each item that should be in FC 200 to avoid the item going out of stock (OOS). Data 302 may also include a value N, representing the number of batch jobs needed to fulfill of current set of orders for picking. Digital map 303 includes A* shortest path algorithm which calculates distance of location pairs and stores all shortest distances in a matrix (DM) to be used directly.

Density algorithm 304, which in some embodiments is executed by SAT system 101 (though in other embodiments may be executed by other systems such as transportation system 107 or fulfillment optimization system 113), receives data 301, 302, and 303. Density algorithm 304 may include several steps, for example: step 305 (Active Zonetypes & Shipments Selection), step 306 (KNN or K-Nearest Neighbors—identify dense area), and step 307 (gradient descent algorithm).

In step 305 (Active Zonetypes & Shipments Selection), SAT system 101 creates batches in less zone types which contain at least T shipments and creating batch in active zone types by selected shipments. In some embodiments, the threshold T is a shipment threshold that indicates an opportunity to create a high-quality batch based on the shipments. In some embodiments, T may be set to 3 times the maximum batch size. Because a PP (process path) may cover multiple zone types, a batch in that PP may cover multiple zone types as well. Accordingly, it may be advantageous to create a batch that covers less zone types (less batch jobs) because less batch jobs for a batch means less picking cycle time. In some embodiments, active zone types contain more items and have high density.

In some embodiments, SAT system 101 may create batches in one or more zone types (e.g., separate areas of the fulfillment center) in order to provide additional efficiencies to the system by making the batching process quicker (e.g., because only items from the same zone may be batched together). SAT system 101 calculates distances between location pairs (e.g., all possible locations for items to be stored in a single floor of the fulfillment center) using an A* search algorithm. In some embodiments, A* search algorithm may be scheduled and run periodically, for example, once per day as it may be computationally expensive. In some embodiments, A* search algorithm may be run each time an arrangement of items in FC 200 changes (e.g., if items are moved around). Next, SAT system 101 receives orders (e.g., from external front end system 103) and consolidates the items of the orders into a list of items.

In step 306 (KNN—identify dense area) SAT system may use K-means clustering and select a first shipment. SAT system 101 may calculate the "K" nearest neighbors (K being a static or dynamic integer) for all unbatched items, in order to determine high density areas of unbatched items in FC 200. In some embodiments, determining the "K" nearest neighbors comprises choosing K items, such as 3 items, and classifying those items as being part of a high density area—e.g., an area in the fulfillment center with items that are densely packed and closer to each other than remaining items in the fulfillment center. For example, in some embodiments, items that are nearest to each other may be determined to be in a high density area. In some embodiments, the value K may be chosen as input size/maximum batch size and maximum batch size may be set by the number of slots in the rebin wall. In some embodiments, the K-Nearest Neighbors (KNN) process in step 306 may be used to identify high density areas. In some embodiments, high density areas may create a high-quality batch.

In step 307 (gradient descent algorithm), SAT system 101 may calculate the picking distance increase per item for all available items and select the item with minimum picking distance by calling the exchange operator described below with respect to FIG. 6. SAT system 101 may, using the exchange operator of FIG. 6 for example, exchange one or more "worst" items (e.g., in terms of how much the item increases the average travel distance for picking) in the batch for one or more "best" items which were not originally selected if the average picking distance per item would be reduced in the batch by picking one or more "best" items. Accordingly, updating the number of batch jobs may be performed by subtracting the number of batch jobs creased in this cycle of density algorithm 304 from the number of batch jobs required (N=N-n). In step 307, SAT system 101 gathers one or more items from a high density area into a single batch by gradient descent algorithm 307. In some embodiment, this includes finding the centroid of an area (e.g., the centroid of an area defined by a set of items), then adding a number of items that are nearest to that centroid. SAT system 101 performs adding of items until maximum batch size is reached. The next item to add may be chosen by determining which item may increase the average distance (number of items in batch/total distance traveled) least. After SAT system 101 has determined a batch, density algorithm 304 may calculate KNN and gather some items from a high density area into a single batch (KNN—identify dense area 306 and Gradient descent algorithm 307) again with the remaining unbatched items to create a new batch. In some embodiments, such processes may be run every five minutes to generate batches. This value is based on the PP (Process Pass) which is the average time for pickers to pick an average batch.

In some embodiments, gradient descent algorithm 307 may be used to create a batch with short picking distance. Specifically, gradient descent algorithm 307 may choose a shipment to add to a batch which increases the minimum picking distance the least. Gradient descent algorithm 307 may repeat this process until a maximum batch size is reached.

After using the gradient descent algorithm in step 307, process 300 proceeds to step 308, where SAT system 101 determines if N (the remaining number of batches needed to fulfill the current orders) is greater than 0. If yes, process 300 returns back to step 305 (Active Zonetypes & Shipments Selection) to select more items and create more batches. If no, the density algorithm outputs the created batches at step 309. Outputting the created batches may comprise, in some embodiments, sending data relating to the items in each batch to mobile devices (e.g., 119A/119B) with instructions to display an indication to pick the items.

In some embodiments, density algorithm 304 prevents the batching of three times the maximum number of items per batch (the maximum number of items per batch is varied in different PP) in order to maintain some items for a next batch. This maximizes the processing efficiency of SAT system 101 because there may be items that may be batched when a new order comes in. This also maximizes pickers' efficiency and utilization and minimizes distance traveled. In some embodiments, the maximum number of items per batch may be two, four, five, twenty, or other values.

Figure 4:
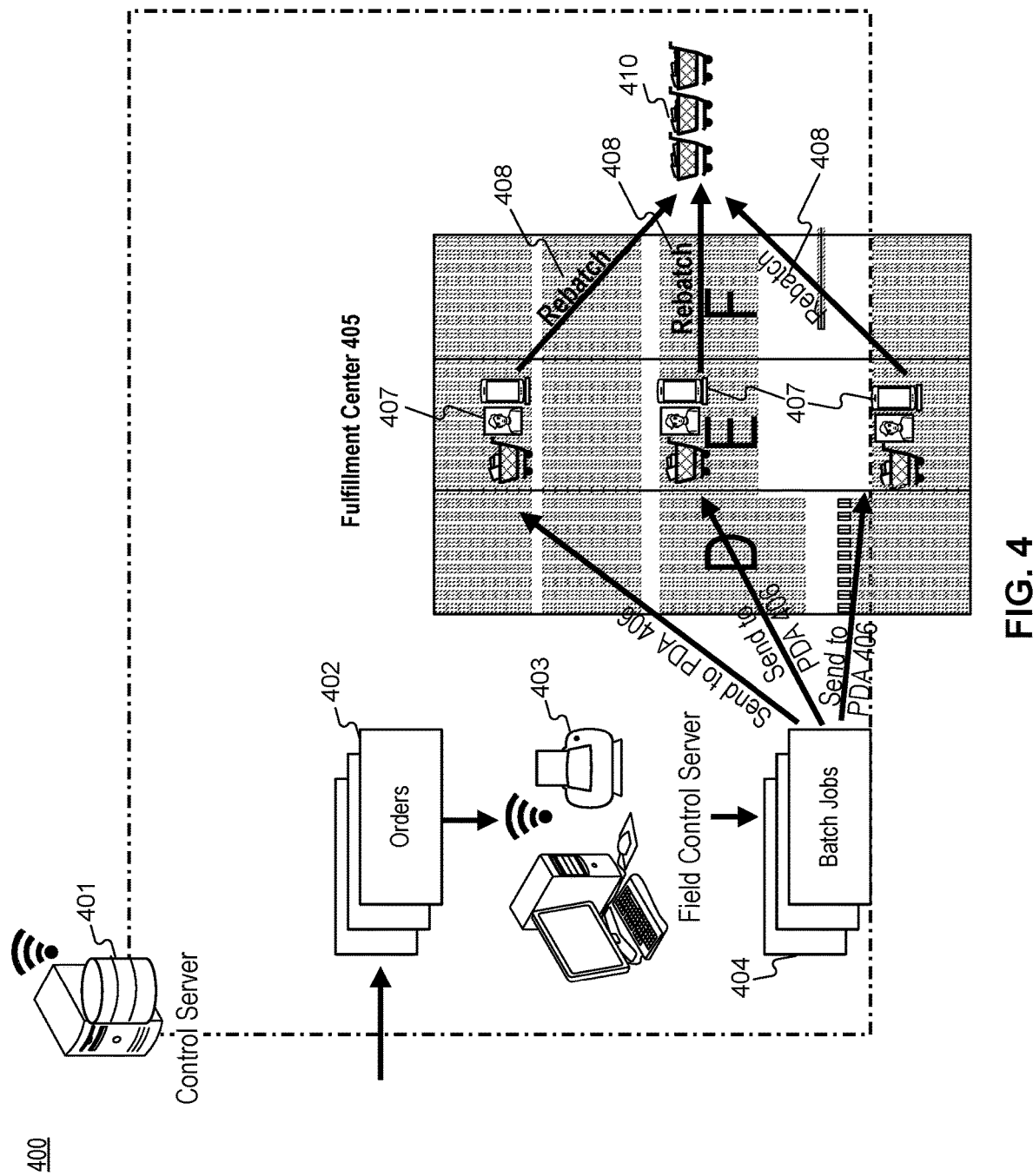
FIG. 4 is a diagrammatic illustration of an exemplary process including data flow of batch creation, consistent with the disclosed embodiments.

FIG. 4 is a diagrammatic illustration of an exemplary process 400 including data flow of batch creation, consistent with the disclosed embodiments.

Process 400 depicts control server 401 for server-to-server network connections to be connected to one or more of the systems of FIG. 1A. In some embodiments, mobile device 102A or computer 102B of FIG. 1A may send order information (comprising one or more desired items) through a website hosted on external front end system 103 of FIG. 1A (e.g., as described above with regard to FIGS. 1B-1E). In process 400, external front end system 103 may receive orders 402 and forward them to shipment and order tracking system 111 of FIG. 1A, which in turn may store and forward them to field control server 403. (In some embodiments, field control server 403 may be implemented as described above with respect to SAT system 101.) Field control server 403 may then create batch jobs 404 (as described and shown in FIG. 3) using density algorithm 304 of FIG. 3.

Process 400 further depicts that instructions for picking may be sent by SAT system 101 and/or WMS 119 to a user device (e.g., mobile device/PDA 119B of FIG. 1A) providing a list of the items of the batch for adding/gathering in the single batch and a location of those items in fulfillment center 405. At step 406, SAT system 101 sends information from batch jobs 404 to a device (e.g. mobile device/PDA 119B). For example, picking takes place in picking zone 209 of FIG. 2, where a picker 407—workers or machines—picks items from individual orders of a batch and places them into totes, into boxes, onto carts, or into/onto another movable container or vehicle. Upon completed picking, SAT system 101 may send an instruction to a mobile device (e.g. operated by the picker) to send the picked items for rebatch in step 408. During the rebatch step, the items in the totes may be reorganized to be prepared for shipment. In some embodiments, picking entails selecting items from individual orders of a batch and placing them into totes. In some embodiments rebatch entails collecting all the totes for one batch and reorganizing the totes by recombining the totes 410 to have items from one order in the same tote. In some embodiments, rebin entails categorizing the totes into the shipment. In some embodiments, packing entails preparing and boxing up the rebinned orders for shipment. SAT system 101 may determine appropriate operations for picking/rebatching/rebinning, generate instructions corresponding to the operations, and send the instructions to a mobile device to order a picker to perform a particular task.

Figure 5:
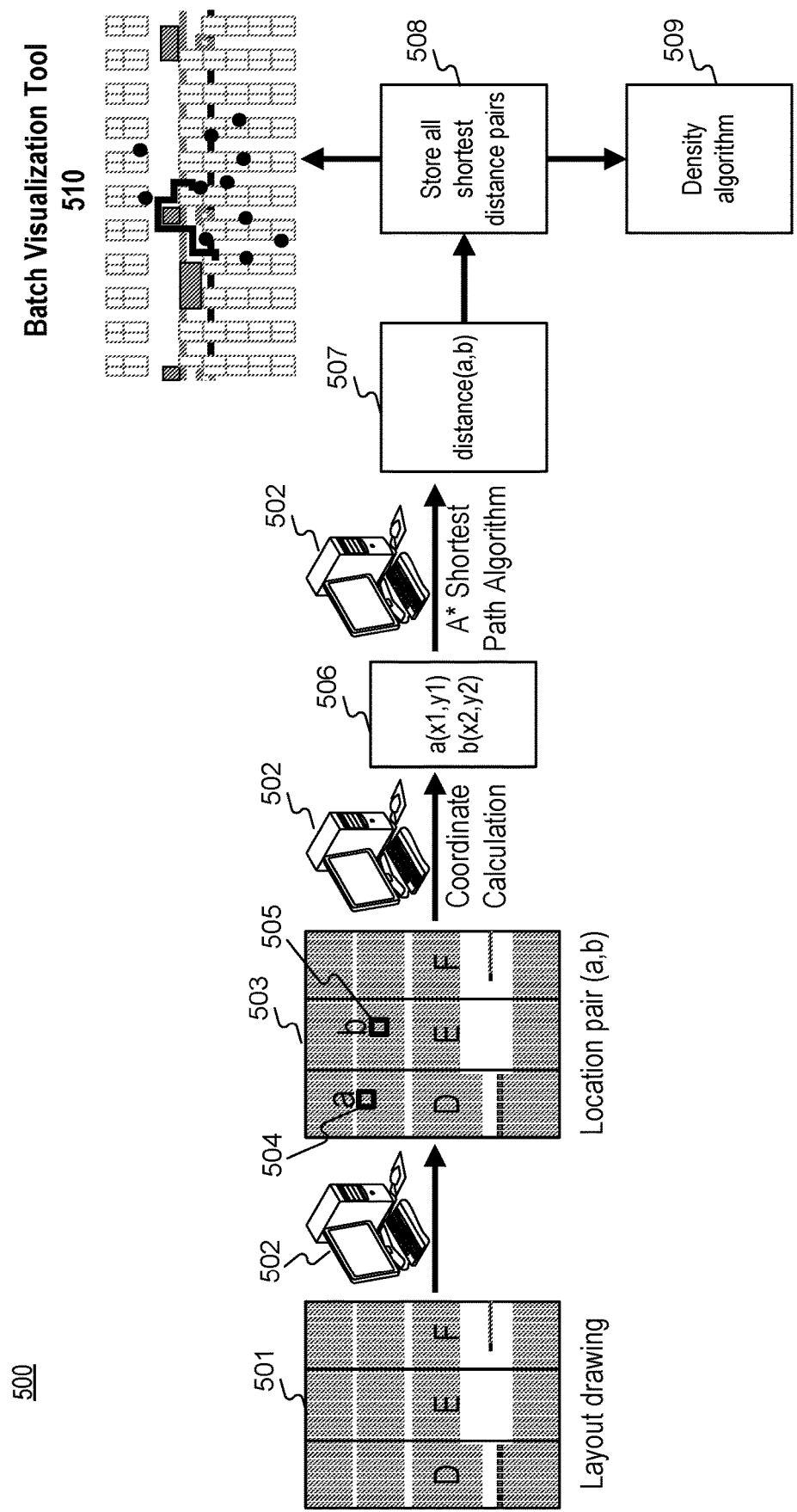
FIG. 5 is a diagrammatic illustration of an exemplary process including a batch visualization tool, consistent with the disclosed embodiments.

FIG. 5 is a diagrammatic illustration of an exemplary process 500 including a batch visualization tool, consistent with the disclosed embodiments.

In process 500, SAT system 101 receives a layout drawing 501 and create location pairs (a,b) 503 with coordinate a 504 and coordinate b 505 using computer 502. In some embodiments, layout drawing 501 is a digital map that includes data representing locations that items in FC 200 are stored. In some embodiments, layout drawing 501 may be prepared by an operator. In some examples, layout drawing 501 may be provided be in various formats including plaintext, XML (eXtensible Markup Language), KML (Keyhole Markup Language), GML (Geography Markup Language), or the like.

In step 503, SAT system 101 performs a coordinate calculation via computer 502 to create coordinates a (x1, y1) and b (x2, y2) 506. Process 500 further depicts SAT system 101 using A* Shortest Path Algorithm via computer 502 to create distance (a,b) 507. In some embodiments, SAT system 101 calculates shortest path of all location pairs for each floor of the fulfillment center with A* algorithm.

In some embodiments, A* is a high efficiency shortest path algorithm. A* may be a computer algorithm used in pathfinding and graph traversal (the process of finding a path between multiple points called nodes). In some embodiments, A* may have high performance and accuracy. However, in practical travel-routing systems, A* may be outperformed by algorithms which can pre-process the graph to attain better performance. In some embodiments, A* may be used to find shortest path between all location pairs. In other embodiments, alternative methods and algorithms may be used for shortest path searching algorithm, such as Dijkstra algorithm.

SAT system 101 stores, for the one or more items, a distance between the item and a closest second item— all shortest distance pairs 508. In some embodiments, SAT System 101 stores the shortest distance pairs 508 in a file or other data storage (e.g., a database). The shortest distance may be saved in a file instead of being computed during batch creation. Specifically, shortest distance pairs 508 are stored in memory to in order to be accessed quickly. In separated files for different fulfillment centers and floors, the files may be in raw format (binary files). SAT system 101 then provides the shortest distance pairs to density algorithm 509 (same as density algorithm 304 of FIG. 3) and to batch visualization tool 510 which shows all items in a batch in a digital map. The digital map includes detail information (e.g., distance) for a batch. In some embodiments, the digital map may be sent with instructions for picking to a user device (e.g., mobile device/PDA 119B of FIG. 1A) providing a list of items for gathering in the single batch and a location of those items in the fulfillment center.

In some embodiments, the process 500 is maintained. Whenever the layout drawing 501 or digital map is changed, SAT system 101 (or another system) may trigger a directed acyclic graph (DAG) to generate a new digital map. In some embodiments, the DAG may be a collection of tasks organized to reflect relationships, dependencies, and other properties. For example, a DAG could comprise four tasks (A, B, C, and D); the DAG indicates the order of operations of those tasks as well as dependencies (e.g., B must be complete before C may run, but A may run whenever). The DAG may be used to instantiate task clusters (or "jobs"). Such clusters may be used for a single batch job, an interactive session with multiple jobs, or a long-lived server continually satisfying requests. In some embodiments, DAG task may submit Spark jobs to calculate shortest paths in yarn cluster.

In some embodiments, SAT system 101 uses the digital map to measure quality of a batch. In some embodiments, SAT system 101 measures the quality of the batch by how close the items in the batch are to each other. In some embodiments, batch picking distance may be calculated using a digital map. In some embodiments, the shorter the picking distance per item, the batch may be of higher quality.

FIG. 6 depicts results of a gradient descent algorithm for walking distance optimization consistent with the disclosed embodiments.

The gradient descent algorithm (step 307 of FIG. 3) evaluates score candidate of items to be added to a batch. For example, a score $s_s$ may be calculated as $s_d/s_u$. Gradient descent algorithm 307 tries to add every item into the batch. $s_u$ denotes how many units or items in a shipment. $s_d$ is the calculated picking distance increased by an item. Gradient descent algorithm 307 selects the item with minimum $s_s$, and adds the item into the batch. In some embodiments, selecting the item with minimum $s_s$ includes selecting the item that has the lowest score. In some embodiments, selecting the item with minimum $s_s$ includes selecting the item that increases the score the least. In some embodiments, gradient descent algorithm 307 selects the shipment (which may contain many items) that has lowest score which means it takes lowest efforts (picking distance) to pick all items in the shipment.

Gradient descent algorithm 307 also evaluates score of worst shipments in batch, $s_w$. Moreover, evaluating does not involve the score of best items in batch, $s_b$. Gradient descent algorithm 307 determines if $s_b > s_w$. If so, then gradient descent algorithm 307 exchange the two shipments and the total picking distance may decrease, which increases the quality of the batch. In some embodiments, the exchange operator of FIG. 6 may be used after reaching a maximum size shipment for a batch. In some embodiments, the exchange operator of FIG. 6 may be used to find the best shipment outside of the batch to exchange with the worst shipment in the batch to reduce the overall picking distance of the batch. For instance, if removing the worst shipment would reduce the overall picking distance of a batch by 10 meters and adding the best shipment (which is not in the batch) would increase the overall picking distance 5 meters, exchanging these two shipments would reduce the overall picking distance by 5 meters.

The score of a shipment (which may contain many items) is the average picking distance costed for picking all items in that shipment. If the score is low, it means that it costs shorter picking distance to pick all the items, otherwise, it would cost longer picking distance.

Maps 600 and 650 in FIG. 6 show items in various locations of FC 200. Circles represent items currently in a batch. Triangles and squares represent items that are candidates to replace items in the batch or be added to the batch. A high score for a candidate item may indicate it is close in distance to the items in a batch.

In map 600, the score of the square item is $b_s$ and the score of the triangle item is $g_s$. Since the triangle item is closer in distance to items in the batch than the square item, the score that item is higher ($g_s > b_s$), and thus gradient descent algorithm 307 may select the triangle item to be placed into the batch instead of the square item.

In system 650 exemplifying an exchange operator as disclosed above with respect to FIG. 3, item B in the batch is the worst item in the batch because of its proximity to the other items in the batch and its score is $B_w$. Furthermore, item A is the best item among the triangle candidates to replace items in the batch (circles) because it is closer to the items in the batch than the other candidate items and its score is $A_b$. In some embodiments, if $A_b > B_w$, gradient descent algorithm 307 may remove item B from the batch and replace it with item A because item A has a higher score and is closer than item B to the items in the batch.

Figure 7:
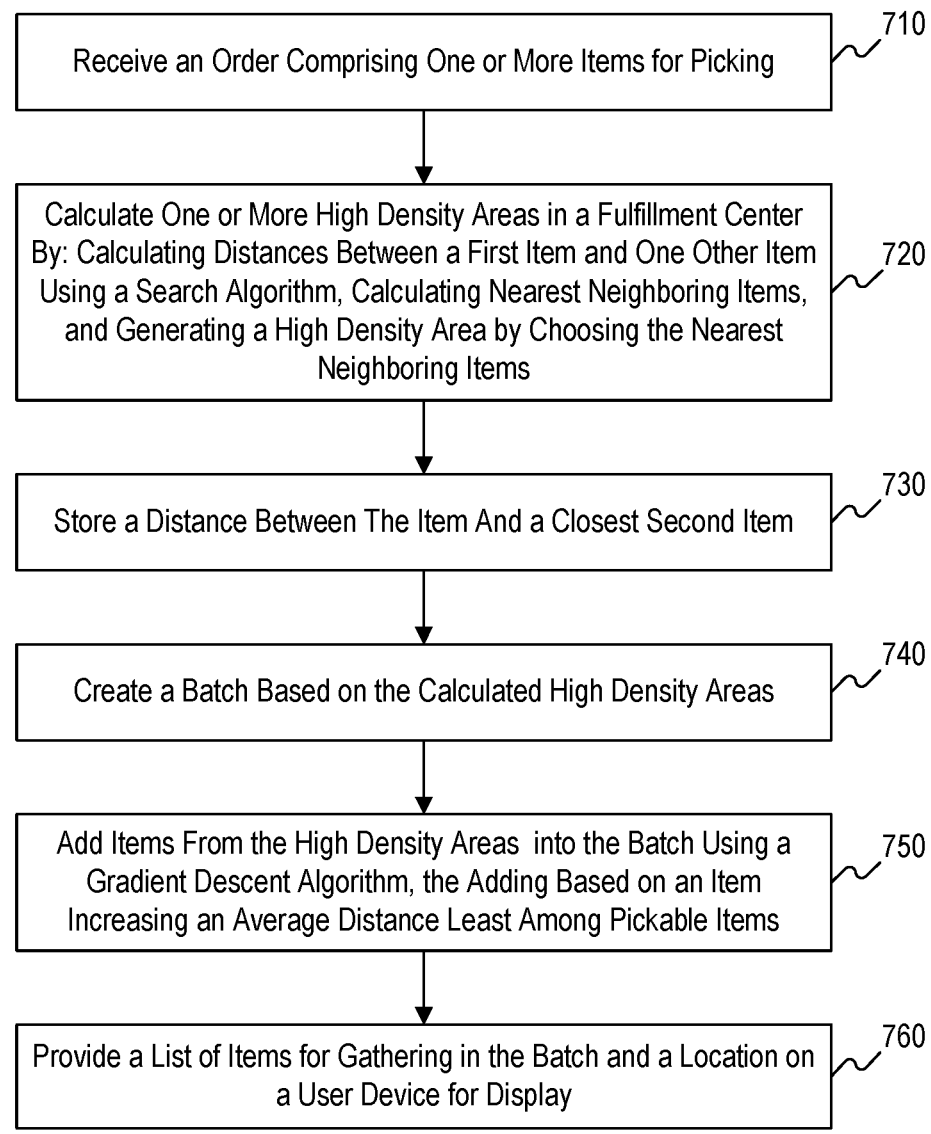
FIG. 7 is a block diagram of an exemplary process for batch optimization, consistent with disclosed embodiments.

FIG. 7 is a block diagram of an exemplary process for batch optimization. Process 700 may be performed by processor of, for example, SAT system 101, which executes instructions encoded on a computer-readable medium storage device. It is to be understood, however, that one or more steps of process 700 may be implemented by other components of system 100 (shown or not shown).

At step 710, system 100 may receive a plurality of orders, each order comprising one or more items for picking. In some embodiments, items of each order may have been placed by users at devices mobile device 102A or computer 102B of FIG. 1A through a website hosted on external front end system 103 of FIG. 1A.

Additionally, SAT system 101 may consolidate the one or more items in orders into a list of items. In some embodiments, the list of items may be stored in a database or in memory as discussed above with respect to data from DB 301 of FIG. 3. At step 720, SAT system 101 may calculate one or more high density areas in a fulfillment center by calculating distances between one or more location pairs of items from the list of items using a search algorithm, and calculating nearest neighboring items for all the items as discussed above with respect to density algorithm 304. Density algorithm 304 calculate KNN (KNN—identify dense area 306 of FIG. 3) for all unbatched items in order to determine high density areas of the fulfillment center floor. In some embodiments, density algorithm 304 of FIG. 3 chooses K items and segments those into a high density area. In some embodiments, the value K may be chosen as input size/maximum batch size and maximum batch size may be set by the number of slots in the rebin wall.

At step 730, as discussed above with respect to step 303 of FIG. 3 and generally discussed with respect to FIG. 5, SAT system 101 may store all shortest distances of all the items in memory.

At step 740, as discussed above with respect to steps 305 and 306, SAT system 101 may create one or more batches based on the calculated one or more high density areas.

At step 750, as discussed above with respect to step 307, SAT system 101 may add items from the one or more high density areas into a single batch using a gradient descent algorithm, the adding based on an item increasing an average distance least among pickable items.

At step 760, SAT system 101 may provide a list of items for adding in the single batch and a location on a user device for display. SAT system 101 of FIG. 1A may send a message to the worker's PDA (e.g., mobile device/PDA 119B of FIG. 1A) providing a list of items for gathering in the single batch and a location of those items. Display 400 (corresponding to tablet 119A, mobile device/PDA 1196, computer 119C of FIG. 1A) includes a user interface presented to workers. As a result, SAT system 101 may improve the process of shipping through batch optimization by finishing orders faster because items reflected on the worker's PDA (e.g., mobile device/PDA 119B of FIG. 1A) are closer and may be picked more quickly, so the worker may move to the next batch faster.

While the present disclosure has been shown and described with reference to particular embodiments thereof, it may be understood that the present disclosure may be practiced, without modification, in other environments. The foregoing description has been presented for purposes of illustration. It is not exhaustive and is not limited to the precise forms or embodiments disclosed. Modifications and adaptations may be apparent to those skilled in the art from consideration of the specification and practice of the disclosed embodiments. Additionally, although aspects of the disclosed embodiments are described as being stored in memory, one skilled in the art may appreciate that these aspects may also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules may be created using any of the techniques known to one skilled in the art or may be designed in connection with existing software. For example, program sections or program modules may be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for batch picking optimization, the system comprising:
one or more memory devices storing instructions; and
one or more processors configured to execute the instructions to:
receive an order at a first server from a second server, over a communication network, the order comprising one or more items for picking;
calculate one or more high density areas in a fulfillment center by:
calculating distances, by a third server, between a first item in the one or more items and at least one other item in the one or more items using a search algorithm,
calculating nearest neighboring items for the one or more items, and
generating a high density area by choosing a plurality of the nearest neighboring items;

store at the first server, for the one or more items, a distance between the item and a closest second item;
create a batch at the third server based on the calculated one or more high density areas;
add items from the one or more high density areas into the batch using a gradient descent algorithm, the adding based on an item increasing an average distance least among pickable items, wherein the gradient descent algorithm uses a digital map to determine an exchange of items that will increase a quality of the batch;
provide shortest distance pairs by the third server to a batch visualization tool for displaying the items in the batch;
provide, by the third server over the communications network, the digital map and instructions with a list of items for gathering in the batch to a mobile user device for display;
receive, by the third server over the communications network, detail information for the batch and scanned item data; and
update, by the third server, the digital map based on a change associated with stowed items and the detail information for the batch.

2. The system of claim 1, wherein the high density areas are calculated based on optimizing choosing of the nearest neighboring items to incur minimal travel distance.

3. The system of claim 1, wherein the gradient descent algorithm comprises finding the centroid of an area and the items are added based on being nearest to the centroid of the area.

4. The system of claim 1, wherein:
the user device is one of a PDA, a smart phone, a tablet, a laptop, or other computer device; and
wherein the system further comprises a database comprising at least one record associating the user device with a user identifier.

5. The system of claim 1, wherein choosing the plurality of the nearest neighboring items comprises choosing three nearest neighboring items.

6. The system of claim 1, wherein the items in the batch for gathering include a package identifier associated with a Stock Keeping Unit (SKU) for display on the user device.

7. The system of claim 1, wherein calculating distances between items comprises:
retrieving a digital map comprising location pairs, each pair representing two pickable items; and
calculating distances between items using a plurality of the retrieved location pairs.

8. A computer-implemented system for batch picking optimization, the system comprising:
one or more memory devices storing instructions; and
one or more processors configured to execute the instructions to:
receive an order at a first server from a second server, over a communication network, the order comprising one or more items for picking and a digital map segmented into multiple zones;
calculate one or more high density areas in a fulfillment center by:
calculating distances, by a third server, between a first item in the one or more items and at least one other item in the one or more items using a search algorithm in a single zone,
calculating nearest neighboring items for the one or more items, and
generating a high density area by choosing a plurality of the nearest neighboring items;
store at the first server, for the one or more items, a distance between the item and a closest second item;
create a batch at the third server based on the calculated one or more high density areas from items in the single zone;
add items from the one or more high density areas into the batch using a gradient descent algorithm, the adding based on an item increasing an average distance least among pickable items, wherein the gradient descent algorithm uses a digital map to determine an exchange of items that will increase a quality of the batch;
provide shortest distance pairs by the third server to a batch visualization tool for displaying the items in the batch;
provide, by the third server over the communications network, the digital map and instructions with a list of items for gathering in the batch on a mobile user device for display;
receive, by the third server over the communications network, detail information for the batch and scanned item data; and
update, by the third server, the digital map based on a change associated with stowed items and the detail information for the batch.

9. The system of claim 8, wherein the high density areas are calculated based on optimizing choosing of the nearest neighboring items to incur minimal travel distance.

10. The system of claim 8, wherein the gradient descent algorithm comprises finding the centroid of an area and the items are added based on being nearest to the centroid of the area.

11. The system of claim 8, wherein the user device is one of a PDA, a smart phone, a tablet, a laptop, or other computer device; and
wherein the system further comprises a database comprising at least one record associating the user device with a user identifier.

12. The system of claim 8, wherein choosing the plurality of the nearest neighboring items is three nearest neighboring items.

13. The system of claim 8, wherein items in the batch include a barcode associated with the Stock Keeping Units (SKUs) provided in the list of items for gathering in the batch on the user device for display.

14. The system of claim 8, wherein the digital map comprises location pairs, each pair representing two pickable items.

15. A computer-implemented method for batch picking optimization, the method comprising:
receiving an order, at a first server from a second server, over a communication network, the order comprising one or more items for picking and a digital map segmented into multiple zones, wherein the digital map comprises location pairs, each pair representing two pickable items;
calculating, by one or more processors, one or more high density areas in a fulfillment center by:
calculating, by a third server distances between a first item in the one or more items and at least one other item in the one or more items using a search algorithm in a single zone, by comparing a plurality of the received location pairs,
calculating, by the one or more processors, nearest neighboring items for the one or more items, and generating, by the one or more processors, a high density area by choosing a plurality of the nearest neighboring items;

storing, at the first server and by the one or more processors, for the one or more items, a distance between the item and a closest second item;

creating, at the third server and by the one or more processors, a batch based on the calculated one or more high density areas from items in the single zone;

adding, by the one or more processors, items from the one or more high density areas into the batch using a gradient descent algorithm, the adding based on an item increasing an average distance least among pickable items, wherein the gradient descent algorithm uses a digital map to determine an exchange of items that will increase a quality of the batch;

providing, by the third server shortest distance pairs to a batch visualization tool for displaying the items in the batch;

providing, by the third server over the communications network, the digital map and instructions with a list of items for gathering in the batch on a user device for display;

receiving, by the third server over the communications network, detail information for the batch and scanned item data; and updating, by the third server, the digital map based on a change associated with stowed items and the detail information for the batch.

16. The system of claim 15, wherein the high density areas are calculated based on optimizing choosing of the nearest neighboring items to incur minimal travel distance.

17. The system of claim 15, wherein the gradient descent algorithm comprises finding the centroid of an area and the items are added based on being nearest to the centroid of the area.

* * * * *

UNITED STATES PATENT AND TRADEMARK OFFICE
CERTIFICATE OF CORRECTION

PATENT NO. : 10,783,462 B1
APPLICATION NO. : 16/386948
DATED : September 22, 2020
INVENTOR(S) : Wenting Mo et al.

Page 1 of 1

It is certified that error appears in the above-identified patent and that said Letters Patent is hereby corrected as shown below:

On the Title Page

Item (57), Lines 2-3 of ABSTRACT, "They system" should read --The system--.

Signed and Sealed this
Seventeenth Day of November, 2020

Andrei Iancu
*Director of the United States Patent and Trademark Office*